(12) United States Patent
Baum et al.

(10) Patent No.: US 8,513,172 B2
(45) Date of Patent: Aug. 20, 2013

(54) PROCESS FOR PREPARING POLYMERS AND COMPOSITIONS THEREOF

(75) Inventors: Marina Baum, Bainbridge Township, OH (US); Barton J. Schober, Perry, OH (US); Mark Davies, Belper (GB); Daniel C. Visger, Mentor, OH (US); John R. Johnson, Euclid, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 983 days.

(21) Appl. No.: 11/577,769

(22) PCT Filed: Oct. 21, 2005

(86) PCT No.: PCT/US2005/038138
§ 371 (c)(1),
(2), (4) Date: Jan. 21, 2009

(87) PCT Pub. No.: WO2006/047393
PCT Pub. Date: May 4, 2006

(65) Prior Publication Data
US 2009/0118150 A1 May 7, 2009

Related U.S. Application Data

(60) Provisional application No. 60/621,745, filed on Oct. 25, 2004.

(51) Int. Cl.
*C10M 145/14* (2006.01)

(52) U.S. Cl.
USPC .................................................. 508/469

(58) Field of Classification Search
USPC .............. 508/459, 475, 500, 507, 508, 469
See application file for complete search history.

(56) References Cited

U.S. PATENT DOCUMENTS

| | | | |
|---|---|---|---|
| 4,620,048 A * | 10/1986 | Ver Strate et al. | 585/10 |
| 5,496,898 A * | 3/1996 | Sutherland et al. | 525/299 |
| 5,552,491 A | 9/1996 | Mishra et al. | |
| 5,955,405 A * | 9/1999 | Liesen et al. | 508/469 |
| 6,369,162 B1 | 4/2002 | Visger et al. | |
| 6,479,584 B1 | 11/2002 | Nakagawa | |
| 6,506,899 B1 | 1/2003 | Simms | |
| 6,545,095 B1 | 4/2003 | Solomon | |
| 6,642,318 B1 | 11/2003 | Chiefari et al. | |
| 6,720,395 B2 | 4/2004 | Nakagawa | |
| 2002/0147118 A1 * | 10/2002 | Visger et al. | 508/466 |
| 2002/0151443 A1 * | 10/2002 | Srinivasan | 508/273 |
| 2003/0139553 A1 * | 7/2003 | Matyjaszewski et al. | 526/319 |
| 2004/0106732 A1 * | 6/2004 | Tsuji et al. | 525/94 |
| 2004/0171777 A1 | 9/2004 | Le et al. | |
| 2006/0189490 A1 * | 8/2006 | Dardin et al. | 508/469 |
| 2007/0244018 A1 | 10/2007 | Visger et al. | |

FOREIGN PATENT DOCUMENTS

| | | |
|---|---|---|
| CA | 2519555 | 10/2004 |
| DE | 10314776 | 10/2004 |
| EP | 0425027 | 5/1991 |
| EP | 1533327 | 5/2005 |
| WO | 9801478 | 1/1998 |
| WO | 0002939 | 1/2000 |
| WO | 2005/056739 | 6/2005 |
| WO | 2006/047398 | 5/2006 |
| WO | 2007025837 | 3/2007 |

OTHER PUBLICATIONS

Chiefari, et al., "Living Free-Radical Polymerization by Reversible Addition-Fragmentation Chain Transfer: The RAFT Process", Macromolecules 1998, 31, 5559-5562, Jul. 22, 1998.
Barner et al., "Polymers with Well-Defined End Groups via RAFT—Synthesis, Applications and Postmodifications", Handbook of RAFT Polymerization, Barner-Kowollik, Ed., Wiley-VCH, Weinheim, 2008, see pp. 445-456.
Baek et al., "Star Shaped Polymers by Metal-Catalyzed Living Radical Polymerization," Macromolecules 2001, 34, pp. 215-221, Dec. 15, 2000.
Baek et al., "Core Functionalized Star Polymers by Transition Metal-Catalyzed Living Radical Polymerization, 1," Macromolecules 2001, 34, pp. 7629-7635, Sep. 25, 2001.
Baek, et al., "Core Functionalized Star Polymers by Transition Metal-Catalyzed Living Radical Polymerization, 2," Macromolecules 2002, 35, pp. 1493-1498, Jan. 29, 2002.
Matyjaszewski et al., Handbook of Radical Polymerization, pp. 645-646, 2002.
Internet printout, Asteric(TM) Viscosity Modifiers, Lubrizol, accessed May 11, 2012.
Lubrizol Additives—Chemistry and Applications, Rudnick (CRC Press, Boca Raton, 2003) pp. 421-423.
Lubricants and Special Fluids, Stepina (Elsevier, NY, 1992) pp. 357, 358, 404.
Observation by Third Party, European Patent Office, Aug. 9, 2012.

* cited by examiner

*Primary Examiner* — Taiwo Oladapo
(74) *Attorney, Agent, or Firm* — Michael F. Esposito; David M. Shold

(57) ABSTRACT

The present invention provides a process for preparing a polymer, employing the steps of: (1) contacting a free radical initiator; a chain transfer agent containing a thiocarbonyl thio group and a free radical leaving group; and a radically polymerisable monomer, to form a polymer chain; and (2) contacting the polymer chain of step (1) with at least one of a polyvalent coupling agent, a polymerization inhibitor, a grafting acylating agent, an amine and an oil of lubricating viscosity. The invention further provides compositions and uses for the polymer.

20 Claims, No Drawings

PROCESS FOR PREPARING POLYMERS AND COMPOSITIONS THEREOF

FIELD OF INVENTION

The present invention relates to a process for the preparation of a polymer in the presence of a thiocarbonyl compound. The invention also relates to compositions containing the polymer.

BACKGROUND OF THE INVENTION

The use of polymers as a rheology modifier (or viscosity modifier) or as a dispersant in a coating composition and/or an oil of lubricating viscosity is well known. Typically polymers with rheology modifier properties have a number average molecular weight of 25,000 or higher. In contrast polymers with a dispersant property have a number average molecular weight of less than 25,000.

The use of a viscosity modifier or dispersant in an oil of lubricating viscosity to impart desired low and high temperature viscometrics and other viscosity properties is well known. Examples of a viscosity modifier include a polymethacrylate, poly(maleic anhydride-co-styrene ester) or a polyolefin. The performance of a viscosity modifier is determined by a number of factors including (1) balanced viscosity; (2) shear stability; (3) low temperature viscometrics; and (4) molecular weight. If the molecular weight of a conventional linear viscosity modifier is increased, the viscosity increases whilst shear stability decreases and vice versa. Often this leads to formulations requiring additional amounts of lower molecular weight viscosity modifier. However, the presence of additional amounts of lower molecular weight viscosity modifier has a detrimental effect on low temperature viscometrics.

PCT application WO 00/02939 A1 discloses a process for preparing microgels and star polymers. The process includes atom transfer radical polymerisation and reversible addition fragmentation transfer polymerisation (RAFT). The microgel is formed from a prepolymer reacting with a multi-olefinic monomer and the product formed has a weight average molecular weight of $10^4$ to $10^8$.

U.S. Pat. No. 6,369,162 (Visger et al.) discloses a stabilised free radical polymerisation process for preparing a radial polymer containing at least 3 polymeric arms. A stabilized free radical agent is employed in the process to preserve an active polymerisation site at the terminus of the polymer. The process further includes adding at least one coupling agent to react with the polymer with an active polymerisation site at the terminus to form a radial polymer.

PCT Application 98/01478 and U.S. Pat. No. 6,642,318 disclose a free radical polymerisation process with living characteristics employing a dithio chain transfer agent. The process controls the polydispersity and molecular weight of the polymer being formed. The polymers are useful as binders in automotive and refinish coatings.

U.S. Pat. No. 6,596,899 discloses S,S'-bis-(α,α-disubstituted-α-acetic acid)-trithiocarbonate compounds as a chain transfer agent for polymerising free radical monomers. The trithiocarbonate compounds are suitable for living free radical polymerisation as well as forming telechelic polymers.

It would be advantageous to have a polymer with at least one of reduced polydispersity, modified low temperature viscometrics, modified high temperature viscometrics, modified shear stability and capable of imparting dispersant and/or viscosity modifying properties. The present invention provides a process for preparing a polymer with at least one property of reduced polydispersity, low temperature viscometrics, high temperature viscometrics, shear stability and capable of imparting dispersant and/or viscosity modifying properties; and compositions thereof.

SUMMARY OF THE INVENTION

The invention provides a process for preparing a polymer, comprising the steps of:
(1) contacting:
   (i) a free radical initiator;
   (ii) a chain transfer agent containing a thiocarbonyl thio group and a free radical leaving group; and
   (iii) a radically polymerisable monomer, to form a polymer chain;
wherein the process of step (1) is a controlled radical polymerisation process with living characteristics; and at least about 50% of the polymer chains from step (1) contain a reactive end group capable of reacting with a polyvalent coupling agent;
and optionally one or more of steps (2) or (3):
(2) contacting the polymer of step (1) with a polyvalent coupling agent to form a star-polymer;
(3) contacting the polymer of step (1) or step (2) with a polymerisation inhibitor; and
(4) mixing the polymer of step (1) or step (2) or step (3) with an oil of lubricating viscosity to form a lubricating composition.

The invention further provides a lubricating composition comprising:
(a) a polymer from a reversible addition-fragmentation chain transfer controlled radical polymerisation process; and
(b) an oil of lubricating viscosity.

DETAILED DESCRIPTION OF THE INVENTION

The present invention provides a process for preparing a polymer as described above.

In one embodiment invention further provides a process for preparing a polymer, comprising the steps of:
(1) contacting:
   (i) a free radical initiator;
   (ii) a chain transfer agent containing a thiocarbonyl thio group and a free radical leaving group; and
   (iii) a radically polymerisable monomer, to form a polymer chain;
wherein the process of step (1) is a controlled radical polymerisation process with living characteristics; and at least about 50% of the polymer chains from step (1) contain a reactive end group capable of reacting with a polyvalent coupling agent;
and at least one of steps (2) through (4):
(2) contacting the polymer of step (1) with a polyvalent coupling agent to form a star-polymer;
(3) contacting the polymer of step (1) or step (2) with a polymerisation inhibitor;
(4) mixing the polymer of step (1) or step (2) or step (3) with an oil of lubricating viscosity to form a lubricating composition,
wherein the chain transfer agent is excludes at least one of cumyl dithiobenzoate, a di- or tri-thiobenzoate, a dithiophthalate or a dithioacetate.

In one embodiment invention further provides a process for preparing a polymer, comprising the steps of:

(1) contacting:
 (i) a free radical initiator;
 (ii) a chain transfer agent containing a thiocarbonyl thio group and a free radical leaving group represented by formula (Ie) or (If):

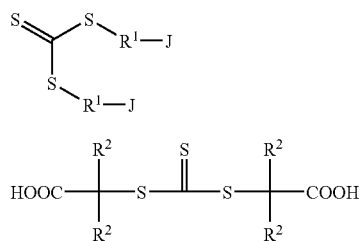

and wherein $R^1$ and $R^2$ and J are defined below; and
 (iii) a radically polymerisable monomer, to form a polymer chain;
wherein the process of step (1) is a controlled radical polymerisation process with living characteristics; and at least about 50% of the polymer chains from step (1) contain a reactive end group capable of reacting with a polyvalent coupling agent;
and at least one of steps (2) through (4):
(2) contacting the polymer of step (1) with a polyvalent coupling agent to form a star-polymer;
(3) contacting the polymer of step (1) or step (2) with a polymerisation inhibitor; and
(4) mixing the polymer of step (1) or step (2) or step (3) optionally with an oil of lubricating viscosity to form a lubricating composition.

Optionally, the process further comprises a medium for polymerisation in steps (1) and/or (2). In one embodiment the process excludes step (2) and the polymer formed is a linear-polymer.

In one embodiment the star polymer is free of an alkali metal or silicon and is not prepared by anionic polymerization methods or by group-transfer polymerization methods.

The process for preparing the polymer in one embodiment is a reversible addition-fragmentation chain transfer (hereinafter referred to as RAFT) controlled radical polymerisation process and is believed to have living characteristics.

A detailed description of RAFT technology and its polymerisation mechanism is given in Chapter 12, pages 629 to 690 of the "Handbook of Radical Polymerisation", Edited by Krzysztof Matyjaszewski and Thomas P. Davis, Copyright 2002 and published by John Wiley and Sons Inc (hereinafter referred to as "Matyjaszewski et al."). The mechanism of RAFT polymerisation is shown on page 664 to 665 in section 12.4.4 of Matyjaszewski et al. Another detailed description of the proposed mechanism is given in PCT application 98/01478 on page 8, line 25 to page 9, line 30.

The RAFT polymerisation process produces a propagating radical that forms a polymer chain. At least 50% of the polymer chains from step (1) contain a reactive end group capable of reacting with other monomers, such as the polyvalent coupling agent. In another embodiment at least 60% of the polymer chains from step (1) contain a reactive end group and in another embodiment at least 70% of the polymer chains from step (1) contain a reactive end group. Overall the process provides a mechanism for chain equilibration and accounts for the polymerisation having living characteristics.

In one embodiment the polymerisation process is by reversible addition-fragmentation chain transfer (RAFT) where the star-polymer arms are formed first by the process of step (1) followed by contacting the arms of step (1) with the polyvalent coupling agent.

In general, the polyvalent coupling agent may not be entirely consumed, but the formation of the star polymer is substantially complete when it is observed that the remaining concentration of polyvalent coupling agent does not change further. Alternatively, the completion of the reaction may be determined by measuring the amount or size of the star polymers formed. This may be determined by known rheological techniques or by Gel Permeation Chromatography (GPC).

The process of step (1) and/or (2) is carried out at a temperature in one embodiment in the range of 15° C. to 200° C., in another embodiment 35° C. to 180° C., in another embodiment 60° C. to 150° C. and in another embodiment 80° C. to 130° C. The process of step (3) may be carried out at a temperature in one embodiment from 20° C. to 260° C. and in another embodiment 60° C. to 150° C. The process of step (4) is carried out at a temperature in one embodiment in the range of 15° C. to 200° C., in another embodiment 15° C. to 180° C., in another embodiment 20° C. to 150° C. and in another embodiment 20° C. to 130° C.

The polymerisation process may be carried out as a batch process, a semi-batch process, a continuous process, a feed process or a bulk process. The process may be in an emulsion, in solution or suspension.

The invention further provides a linear or star-polymer obtained (or obtainable) by the process described above. The number of arms on a star polymer may be controlled by a number of parameters including the amount of material from Step (1), the living character of those chains, and the amount of coupling agent. A person skilled in the art will appreciate that increasing the ratio of material from step (1) to the coupling agent would yield star polymers which would have fewer arms, and therefore a lower number average molecular weight. The number of arms may be controlled by modifying the amount of polyvalent coupling agent, increasing the reaction temperature or by adding additional free radical initiator during step (2). In one embodiment the number of arms on the star polymer obtained may be determined by dividing the final star polymer molecular weight by the molecular weight of an arm, determined from an aliquot removed prior to coupling.

In one embodiment the arm of the star-polymer is a di-block AB type copolymer, in another embodiment a tri-block ABA type copolymer, in another embodiment a tapered block polymer, in another embodiment an alternating block polymer.

The polymer obtained by the process described above in one embodiment is a block-arm star polymer and in another embodiment a hetero-arm star polymer. Block copolymers are often prepared by the sequential addition of monomers during a controlled polymerisation. For example, the radically polymerisable monomer of step (1) above, may include two or more or three or more polymerisable monomers be followed by subsequent addition(s) of other monomer(s) to prepare the linear block copolymers. In step (2) linear block copolymers would be coupled forming a block-arm star copolymer. It is understood that the process to make ideal block copolymers generally requires substantially all of a first monomer to be consumed in the polymerisation prior to the addition of a subsequent monomer. Adding the subsequent monomer prior to the consumption of the first, forms a tapered block copolymer. A tapered copolymer has a variable composition across the length of a polymer chain. For example, the tapered copolymer will be composed at one end of a relatively pure first monomer and a relatively purely composed of the second monomer at the other end. The middle of the polymer chain is more of a gradient composition of the two monomers. This tapered block copolymer may also be coupled in step (2) to form block-arm star polymers.

The block-arm star polymer contains a polymer arm derived from two or more monomers where the monomers are on the same arm. A more detailed description of the block-arm star polymer is given in Chapter 13 (pp. 333-368) of "Anionic polymerisation, Principles and Practical Applications" by Henry Hsieh and Roderic Quirk (Marcel Dekker, Inc, New York, 1996) (hereinafter referred to as Hsieh et al.).

The hetero-arm, or "mikto-arm", star polymer contains arms which may vary from one another either in molecular weight, composition, or both, as defined in Hsieh et al. For example, a portion of the arms of a given star polymer are of one polymeric type and a portion of a second polymeric type. More complex hetero-arm star polymers may be formed by combining portions of three or more polymeric arms with a coupling agent. In one embodiment hetero-arm stars may be prepared by combining several batches of polymers with living characteristics prior to step (2).

Generally the length of time step (1) may be carried out for is sufficient to allow high conversion of the radically polymerisable monomer to polymer chain prior to contacting with the polyvalent coupling agent. The star-polymer often will have reduced amounts of radically polymerisable monovalent monomer incorporated into the star polymer core. However, in one embodiment the coupling agent is added prior to the full consumption of the monomer. The remaining monomer is copolymerised with the coupling monomer reducing the crosslink density of the core. A star polymer with a reduced crosslink density of the core may be obtained by contacting the polyvalent coupling agent with the radically polymerisable monomer before high conversion of the radically polymerisable monomer to polymer chain. In order to monitor when the polyvalent coupling agent may be added known analytical techniques such as GPC or IR may be used. The polymer obtained by the process described above in one embodiment is a homopolymer and in another embodiment is a copolymer.

The polymer chain of step (1) in one embodiment has a weight average molecular weight $M_w$ of 1000 to 500,000, in another embodiment 5,000 to 300,000 and in another embodiment 10,000 to 100,000. The star-polymer of step (2) in one embodiment has a weight average molecular weight $M_w$ of 5000 to 5,000,000, in another embodiment 10,000 to 600,000, in another embodiment 10,000 to 400,000 and in another embodiment 15,000 to 400,000. In one embodiment the $M_w$ ranges from 10,000 to 20,000.

The polymer obtained by the process described above of Step (1), in one embodiment has a polydispersity (PDI, that is $M_w/M_n$) of less than 1.5, in another embodiment less than 1.4 and in another embodiment less than 1.3 such as 1.25 to 1 or 1.2 to 1.1.

In one embodiment the star polymer has a polydispersity greater than 2, in one embodiment 3 or more, in another embodiment 4 or more and in another embodiment 5 or more. An upper range on the polydispersity may include 30 or 20 or 15 or 10. Examples of suitable ranges include 2 to 30, 3 to 15 or 3 to 10.

The polymer obtained after step (2) often has a polydispersity equal to or greater than 1.5, due to the presence of varying amounts of uncoupled polymer chains from step (1). In one embodiment the star-polymer of step (2) has a polydispersity of less than 2. In one embodiment two or more star polymers are believed to be coupled (also referred to as star-to-star coupling) and the polydispersity is equal to or larger than 2. The polydispersity of the star coupled polymers is partially due to the presence of varying amounts of uncoupled polymer chains from step (1) and/or star-to-star coupled star-polymers from step (2).

The polydispersity may also be controlled in one embodiment by adding the chain transfer agent before polymerisation and in another embodiment by the addition of the chain transfer agent over the course of the polymerisation.

In one embodiment the polymer prepared by the process described herein comprises a mixture of star and linear polymers. The polydispersity of said mixtures is similar or identical to the ranges described above.

Chain Transfer Agent

RAFT polymerisation processes generally employ a chain transfer agent containing a thiocarbonyl thio group. The chain transfer agent may have transfer constant from 0.05 to 10,000 or 0.1 to 5000. In one embodiment the chain transfer agent containing a thiocarbonyl thio group and a free radical leaving group is represented by formulae (Ia) to (Ig):

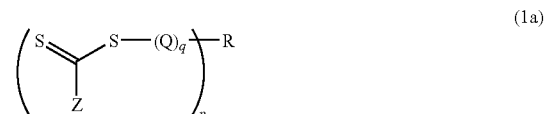

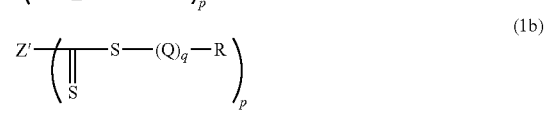

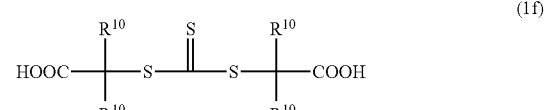

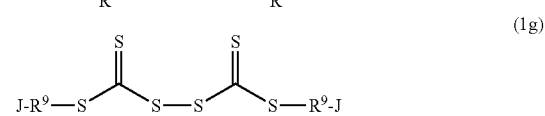

wherein

Z is independently hydrogen, a halogen, such as chlorine, bromine or iodine, a hydrocarbyl group or a group containing a heteroatom bonded directly to the carbon of the thiocarbonyl group and containing a heteroatom including oxygen, nitrogen, phosphorus or sulphur;

Z' is independently a moiety including a polymer chain, a hydrocarbyl group, a heteroatom including oxygen, nitrogen, phosphorus or sulphur further containing at least one carbon atom incorporated into a linear or branched optionally substituted alkyl group and/or aryl group;

Q is a conjugating group;

q is an integer from 0 to 10, 0 to 5, 0 to 3 or 0 to 2 or 0, 1 to 10, 1 to 5, 1 to 3 or 1 to 2;

p is an integer from 1 to 200, 1 to 100, 1 to 50 or 1 to 10;

J is independently a group including cyano, halogen, carboxylic acid, carboxylic ester, and carboxylic amide or imide;

R is a free radical leaving group capable of initiating free radical polymerisation;

each R' is independently a hydrocarbyl group that is optionally substituted with a functional group defined by $R^2$; and $R^2$ is independently a cyano group, a halogen, such as chlorine, fluorine, iodine or bromine, or a hydrocarbyl group such as a linear or branched alkyl group or an aryl group, said hydrocarbyl group containing 1 to 50, 1 to 20, 1 to 10 or 1 to 6 carbon atoms.

In one embodiment when the chain transfer agent is represented by formula (Ie), a carbon of $R^1$ is directly attached to the thio ester sulphur, as is believed to help stabilization of a resultant radical. In one embodiment said carbon is a trialkyl substituted carbon, such as a gem-dimethyl carbon. In another embodiment said carbon is part of a substituted a cyano or aromatic group, independent of J.

In one embodiment a dithio ester chain transfer agent is represented by:

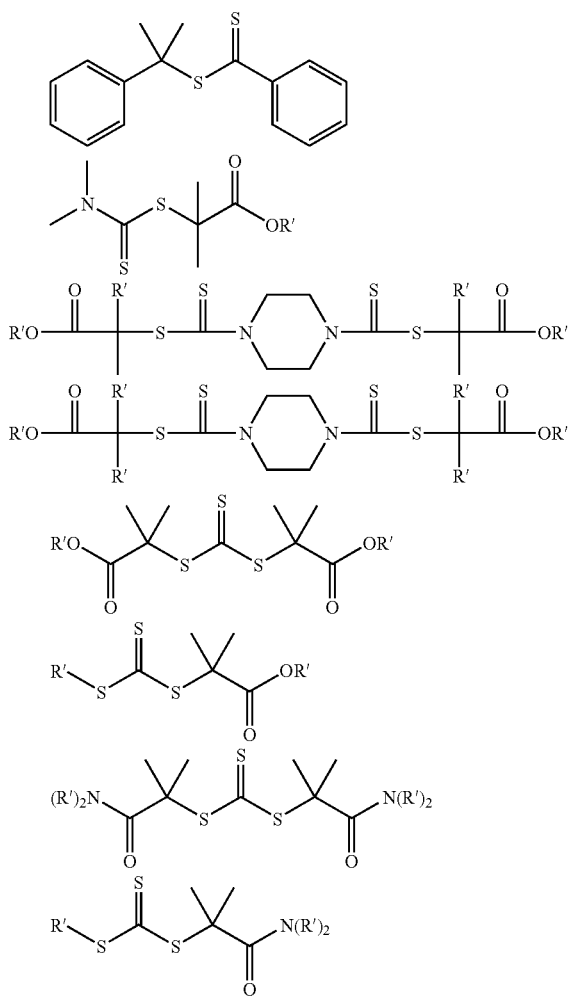

wherein R' is defined above as R, $R^1$ or $R^2$.

Trithiocarbonates (—S—C(=S)—S—) are preferably used, for example structures 1f or 1g, or were Z is a sulphur-containing compound in structures 1a or 1c or Z' is a sulphur-containing compound in structures 1b or 1d. The free radical leaving groups, R or $R^9$, should stabilize a free radical. Tertiary carbon groups, such as geminal dimethyl substitution of an alkyl group is further preferred. The alkyl group may contain further substitution with carboxy groups such as carboxylic acid, ester, or amide functionalities.

In one embodiment the group further comprises a —S—C(=S)— group with a geminal dimethyl group directly attached to the sulphur. In one embodiment wherein at least one of the R groups contains a gem dimethyl moiety directly bonded to the sulphur. In one embodiment the R group(s) containing the gem dimethyl groups further contain a carboxy group.

Examples of a suitable chain transfer agent derived from formulae (Ia) to (Id) include those disclosed in column 28, line 50 to column 37, line 20 of U.S. Pat. No. 6,642,318. Examples of specific compounds include benzyl 1-(2-pyrrolidinone)carbodithioate, benzyl (1,2-benzenedicarboximido) carbodithioate, 2-cyanoprop-2-yl 1-pyrrolecarbodithioate, 2-cyanobut-2-yl 1-pyrrolecarbodithioate, benzyl 1-Imidazolecarbodithioate, N,N-dimethyl-S-(2-cyanoprop-2-yl) dithiocarbamate, N,N-diethyl S-benzyl dithiocarbamate, cyanomethyl 1-(2-pyrrolidone)carbodithoate, cumyl dithiobenzoate, N,N-diethyl S-(2-ethoxycarbonylprop-2-yl) dithiocarbamate, O-ethyl-S-(1-phenylethyl)xanthtate, O-ethyl S-(2-(ethoxycarbonyl)prop-2-yl)xanthate, O-ethyl S-(2-cyanoprop-2-yl)xanthate, O-ethyl S-(2-cyanoprop-2-yl)xanthate, O-ethyl S-cyanomethyl xanthate, O-phenyl S-benzyl xanthate, O-pentafluorophenyl S-benzyl xanthate, 3-benzylthio-5,5-dimethylcyclohex-2-ene-1-thione or benzyl 3,3-di(benzylthio)prop-2-enedithioate.

Examples of a chain transfer agent derived from formula (Ie) or (If) include s,s'-bis-(α,α'-disubstituted-α''-acetic acid)-trithiocarbonate, s,s'-bis-(α,α'-disubstituted-α''-acetic acid)-trithiocarbonate or s-alkyl-s'-(-(α,α'-disubstituted-α''-acetic acid)-trithiocarbonates. A more detailed description is taught in column 2, lines 38-64 and examples 1-3 of U.S. Pat. No. 6,596,899.

A more detailed description of suitable examples of the dithio ester chain transfer agent of the invention is taught on page 24, line 32 to page 26, line 9 and examples 1-18 of PCT application 98/01478. Examples include dithiobenzoic acid, 4-chlorodithiobenzoic acid, benzyl dithiobenzoate, 1-phenylethyl dithiobenzoate, 2-phenylprop-2-yl dithiobenzoate, 1-acetoxyethyl dithiobenzoate, hexakis(thiobenzoylthiomethyl)benzene, 1,4-bis(thiobenzoylthiomethyl)benzene, 1,2, 4,5-tetrakis(thiobenzoylthiomethyl)benzene, 1,4-bis-(2-(thiobenzoylthio)prop-2-yl)benzene, 1-(4-methoxyphenyl) ethyl dithiobenzoate, benzyl dithioacetate, ethoxycarbonylmethyl dithioacetate, 2-(ethoxycarbonyl) prop-2-yl dithiobenzoate, 2,4,4-trimethylpent-2-yl dithiobenzoate, 2-(4-chlorophenyl)prop-2-yl dithiobenzoate, 3-vinylbenzyl dithiobenzoate, 4-vinylbenzyl dithiobenzoate, S-benzyl diethoxyphosphinyldithioformate, tert-butyl trithioperbenzoate, 2-phenylprop-2-yl 4-chlorodithiobenzoate, 2-phenylprop-2-yl 1-dithionaphthalate, 4-cyanopentanoic acid dithiobenzoate, dibenzyl tetrathioterephthalate, dibenzyl trithiocarbonate, carboxymethyl dithiobenzoate or poly(ethylene oxide) with dithiobenzoate end group.

In one embodiment the dithio ester chain transfer agent is used alone and in another embodiment a mixture of dithio ester chain transfer agents is used.

The amount of the chain transfer agent present in the invention in one embodiment is 0.001 to 0.10 moles per mole of monomer, in another embodiment 0.001 to 0.05 moles per mole of monomer and in yet another embodiment 0.001 to 0.01 or 0.03 moles per mole of monomer. Examples of the amount of chain transfer agent being present include 0.002 to 0.006, 0.003 to 0.008 or 0.003 to 0.005 moles per mole of monomer.

Free Radical Initiator

The free radical initiator of the invention is known and includes peroxy compounds, peroxides, hydroperoxides, and azo compounds which decompose thermally to provide free radicals. Other suitable examples are described in J. Brandrup and E. H. Immergut, Editor, "Polymer Handbook", 2nd edition, John Wiley and Sons, New York (1975), pages II-1 to II-40. Examples of a free radical initiator include those derived from a free radical-generating reagent and examples include benzoyl peroxide, t-butyl perbenzoate, t-butyl metachloroperbenzoate, t-butyl peroxide, sec-butylperoxydicarbonate, azobisisobutyronitrile, t-butyl peroxide, t-butyl hydroperoxide, t-amyl peroxide, cumyl peroxide, t-butyl peroctoate, t-butyl-m-chloroperbenzoate, azobisisovaleronitrile or mixtures thereof. In one embodiment the free radical generating reagent is t-butyl peroxide, t-butyl hydroperoxide, t-amyl peroxide, cumyl peroxide, t-butyl peroctoate, t-butyl-m-chloroperbenzoate, azobisisovaleronitrile or mixtures thereof. Commercially available free radical initiators include Trigonox™-21 from Ciba Specialty Chemicals.

The free radical initiator is present in one embodiment from 0.01 to 10 percent by weight based on the total weight of the monomers of step (1)(iii) and in another embodiment from 0.05 to 2 percent by weight based on the total weight of the monomers of step (1)(iii). The molar ratio of free radical initiator to the dithio ester chain transfer agent is in one embodiment from 0.2 to 2:1, in another embodiment from 0.8:1 to 1.2:1 and in yet another embodiment from 1.1 to 1.2:1, for instance, 0.8-0.9:1. In other embodiments the molar ratio of free radical initiator to the dithio ester chain transfer agent ranges from 0.05 to 1:1, or 0.2:1 to 0.8:1, or 0.3 to 0.5:1.

Radically Polymerisable Monomer

The radically polymerisable monomer include (meth)acrylic monomers nitrogen containing monomers, unsaturated anhydrides or vinyl aromatic monomers.

As used herein the term "(meth)acrylic monomer" includes acrylic acid, an ester of acrylic acid, an acrylamide, an acrylonitrile, a methacrylic acid, an ester of methacrylic acid, a methacrylamide, and a methacrylonitrile. In one embodiment the (meth)acrylic monomer is a (meth)acrylic acid, an ester of (meth)acrylic acid, (meth)acrylamide, or (meth)acrylonitrile. In one embodiment the (meth)acrylic monomer is a (meth)acrylate ester derived from a (meth)acrylic acid (often referred to as a methacrylate) or an ester of acrylic acid (often referred to as a acrylate).

For the ester of a (meth)acrylic monomer in one embodiment the number of carbon atoms present in the alcohol-derived portion of the ester group is 1 to 50, in another embodiment 2 to 30, in another embodiment 6 to 26 and in yet another embodiment 8 to 18. The ester of a (meth)acrylic monomer is often commercially available as a mixture with the alcohol-derived portion of the ester group containing 8 to 10 carbon atoms, 12 to 15 carbon atoms or 16 to 18 carbon atoms.

Examples of a (meth)acrylate ester may be derived from saturated alcohols, such as methylmethacrylate, butylmethacrylate, 2-ethylhexyl(meth)acrylate, octyl(meth)acrylate, nonyl(meth)acrylate, isooctyl(meth)acrylate, isononyl (meth)acrylate, 2-tert-butylheptyl(meth)acrylate, 3-isopropylheptyl(meth)acrylate, decyl(meth)acrylate, undecyl(meth)acrylate, 5-methylundecyl(meth)acrylate, dodecyl (meth)acrylate, 2-methyldodecyl(meth)acrylate, tridecyl (meth)acrylate, 5-methyltridecyl(meth)acrylate, tetradecyl (meth)acrylate, pentadecyl(meth)acrylate, hexadecyl(meth) acrylate, 2-methylhexadecyl(meth)acrylate, heptadecyl (meth)acrylate, 5-isopropylheptadecyl(meth)acrylate, 4-tert-butyloctadecyl(meth)acrylate, 5-ethyloctadecyl(meth) acrylate, 3-isopropyloctadecyl(meth)acrylate, octadecyl (meth)acrylate, nonadecyl(meth)acrylate, eicosyl(meth) acrylate, cetyleicosyl(meth)acrylate, stearyleicosyl(meth) acrylate, docosyl(meth)acrylate and/or eicosyltetratriacontyl (meth)acrylate; (meth)acrylates derived from unsaturated alcohols, such as oleyl(meth)acrylate; cycloalkyl(meth)acrylates, such as 3-vinyl-2-butylcyclohexyl(meth)acrylate or bornyl(meth)acrylate.

The ester compounds with long-chain alcohol groups may be obtained, for example, by reaction of a (meth)acrylate with long-chain fatty alcohols, in which reaction a mixture of esters such as (meth)acrylate with alcohol groups of various chain lengths is generally obtained. These fatty alcohols include Oxo Alcohol® 7911, Oxo Alcohol® 7900 and Oxo Alcohol® 1100 of Monsanto; Alphanol® 79 of ICI; Nafol® 1620, Alfol® 610 and Alfol® 810 of Condea; Epal® 610 and Epal® 810 of Ethyl Corporation; Linevol® 79, Linevol® 911 and Dobanol® 25 L of Shell AG; Lial® 125 of Condea Augusta (now Sasol), Milan; Dehydad® and Lorol® of Henkel KGaA (now Cognis) as well as Linopol® 7-11 and Acropol® 91 of Ugine Kuhlmann.

The vinyl aromatic monomer includes styrene, substituted styrene and mixtures thereof. Substituted styrene monomers include functional groups such as a hydrocarbyl groups, halo-, amino-, alkoxy-, carboxy-, hydroxy-, sulphonyl-groups or mixtures thereof. The functional groups include those located at the ortho, meta or para positions relative to the vinyl group on the aromatic monomer, the functional groups are located at the ortho or para position being especially useful. In one embodiment the functional groups are located at the para position. Alkoxy functional groups may contain 1 to 10 carbon atoms, in one embodiment 1 to 8 carbon atoms, in another embodiment 1 to 6 carbon atoms and in yet another embodiment 1 to 4 carbon atoms. Alkoxy functional groups containing 1 to 4 carbon atoms are referred to as lower alkoxy groups.

The hydrocarbyl group of a substituted styrene monomer in one embodiment contains 1 to 30 carbon atoms, in another embodiment 1 to 20 carbon atoms, in another embodiment 1 to 15 carbon atoms and in another embodiment 1 to 10 carbon atoms. Examples of a suitable substituted styrene containing a hydrocarbyl group include alpha-methylstyrene, para-methylstyrene (often referred to as vinyl toluene), para-tert-butylstyrene, alpha-ethylstyrene, para-lower alkoxy styrene and mixtures thereof.

Functionalising with Nitrogen Containing Compound

In one embodiment the polymer is further reacted with a nitrogen containing compound such as a nitrogen containing monomer or an amine or amide other than a nitrogen containing monomer to form a dispersant. Examples of a suitable amine include an amino hydrocarbyl substituted amine, such as 4-aminodiphenylamine, a hydrocarbyl substituted morpholine, such as 4-(3-aminopropyl) morpholine or 4-(2-aminoethyl) morpholine; and a nitrogen containing monomer includes (meth)acrylic amide or dialkyl amino alkyl (meth) acrylate such as a dimethyl amino alkyl (meth)acrylate. In one embodiment the alkyl group of dimethyl amino alkyl (meth)acrylate is propyl and in another embodiment ethyl.

The amide of a (meth)acrylic monomer includes an acrylamide or a methacrylamide such as a hydrocarbyl substituted acrylamide or a hydrocarbyl substituted methacrylamide. In one embodiment the number of carbon atoms present in the hydrocarbyl group is 1 to 40, in another embodiment 1 to 20, in another embodiment 2 to 16 and in yet another embodiment 2 to 8.

In one embodiment the hydrocarbyl substituted acrylamide or a hydrocarbyl substituted methacrylamide or (meth)acrylate monomer of formula (IIa) or (IIb) respectively:

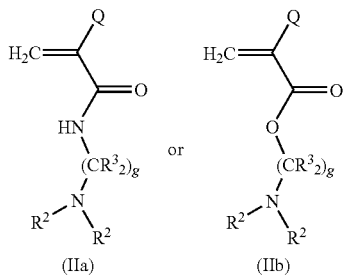

wherein

Q is hydrogen or methyl, and in one embodiment Q is methyl;

each $R^3$ is independently hydrogen or hydrocarbyl group containing 1 to 8 or 1 to 4 carbon atoms;

each $R^4$ is independently a hydrogen or hydrocarbyl group containing 1 to 2 carbon atoms, and in one embodiment each $R^3$ is hydrogen; and g is an integer from 1 to 6 or 1 to 3.

Examples of a suitable nitrogen containing monomer or a hydrocarbyl substituted acrylamide or a hydrocarbyl substituted methacrylamide include vinyl pyridine, N-vinyl imidazole, N-vinyl pyrrolidinone, and N-vinyl caprolactam, dimethylaminoethyl acrylate, dimethylaminoethyl methacrylate, dimethylaminobutylacrylamide dimethyl aminopropylmethacrylate, dimethylaminopropylacrylamide, dimethylaminopropylmethacrylamide, dimethylaminoethylacrylamide or mixtures thereof.

The radically polymerisable monomer from an acylating agent other than (meth)acrylic monomer includes maleic acid or anhydride, a fumaric acid, an itaconic acid or anhydride or mixtures thereof.

In one embodiment the polymer is further grafted with acylating agent and an amine to form a dispersant viscosity modifier (often referred to as DVM), thus named, because they exhibit both dispersant and viscosity modifying properties.

In one embodiment the polyvalent (meth)acrylic monomer is an acrylate or methacrylate ester of a polyol or a methacrylamide of a polyamine In one embodiment the (meth)acrylic monomer used to prepare the polymer contain an ester alkyl group containing 10 to 15 carbon atoms present on the star polymer in one embodiment is at least 50% of the alkyl groups, in another embodiment at least 60% of the alkyl groups, in another embodiment at least 70% of the alkyl groups and in another embodiment at least 80% of the alkyl groups.

Polyvalent Coupling Agent

The invention optionally further includes a polyvalent coupling agent or mixtures thereof. The polyvalent coupling agent of the invention include those of the general formula;

W—(Y)$_n$ where

Y is a functionality capable of covalently reacting with an alkyl radical or an oxygen-centered radical;

W is a hydrocarbyl group; and n=2 or more, 3 or more or 4 or more.

In one embodiment Y is an olefin reactive site. In one embodiment the polyvalent coupling agent is a polyfunctional monomer (or crosslinking monomer). Examples include a polyvalent (meth)acrylic monomer or a polyvalent divinyl non-acrylic monomer.

In one embodiment the polyvalent divinyl non-acrylic monomer is a divinyl benzene. In one embodiment the polyvalent (meth)acrylic monomer is an acrylate or methacrylate ester of a polyol or a polyamine such as an amide of a polyamine, for instance a methacrylamide or an acrylamide of a polyamine. In one embodiment the polyvalent (meth) acrylic monomer is an acrylic or methacrylic acid polyol or a condensation product of a polyamine.

The polyol in one embodiment contains 2 to 20 carbon atoms, in another embodiment 3 to 15 carbon atoms and in another embodiment 4 to 12 carbon atoms; and the number of hydroxyl groups present in one embodiment is 2 to 10, in another embodiment 2 to 4 and in another embodiment 2. Examples of polyols include ethylene glycol, poly (ethylene glycols), alkane diols such as 1,6 hexanene diol for example, or triols such as trimethylolpropane, oligomerized trimethylolpropanes such as Boltorn® materials sold by Perstorp Polyols. Examples of a polyamine include polyalkylenepolyamines, such as, ethylenediamine, diethylenetriamine, triethylenetetramine, tetraethylenepentamine, pentaethylenehexamine and mixtures thereof.

Examples of the polyvalent unsaturated (meth)acrylic monomer include ethylene glycol diacrylate, ethylene glycol dimethacrylate, diethylene glycol diacrylate, diethylene glycol dimethacrylate, glycerol diacrylate, glycerol triacrylate, mannitol hexaacrylate, 4-cyclohexanediol diacrylate, 1,4-benzenediol dimethacrylate, pentaerythritol tetraacrylate, 1,3-propanediol diacrylate, 1,5-pentanediol dimethacrylate, bis-acrylates and methacrylates of polyethylene glycols of molecular weight 200-4000, polycaprolactonediol diacrylate, pentaerythritol triacrylate, 1,1,1-trimethylolpropane triacrylate, pentaerythritol diacrylate, pentaerythritol triacrylate, pentaerythritol tetraacrylate, triethylene glycol diacrylate, triethylene glycol dimethacrylate, 1,1,1-trimethylolpropane trimethacrylate, hexamethylenediol diacrylate or hexamethylenediol dimethacrylate or an alkylene bis-(meth) acrylamide.

The amount of polyvalent coupling agent may be an amount suitable to provide coupling of polymer previously prepared as arms onto a core comprising the coupling agent in monomeric, oligomeric, or polymeric form, to provide a star polymer. As described above, suitable amounts may be determined readily by the person skilled in the art with minimal experimentation, even though several variable may be involved. For example, if an excessive amount of coupling agent is employed, or if excessive unreacted monomer from the formation of the polymeric arms remains in the system, crosslinking rather than star formation may occur. Typically the mole ratio of polymer arms to coupling agent may be 50:1 to 1.5:1 (or 1:1), or 30:1 to 2:1, or 10:1 to 3:1, or 7:1 to 4:1, or 4:1 to 1:1. In other embodiments the mole ratio of polymer arms to coupling agent may be 50:1 to 0.5:1, or 30:1 to 1:1, or 7:1 to 2:1. The desired ratio may also be adjusted to take into account the length of the arms, longer arms sometimes tolerating or requiring more coupling agent than shorter arms. Typically the material prepared is soluble in an oil of lubricating viscosity.

Optional Polymerisation Inhibitor

In one embodiment of the invention the process comprises adding a polymerisation inhibitor. The inhibitor slows or stops further radical reactions. This is useful for limiting the amount of star-to-star coupling or other reactions that may occur after the desired material is prepared. Examples of a polymerisation inhibitor include hydroquinone monomethyl ether or derivatives thereof. Other known types of polymerisation inhibitors include diaryl amines, sulphur-coupled olefins, or hindered phenols.

Optional Medium for Polymerisation

The invention optionally includes a medium for polymerisation. Alternatively the polymerisation may be carried out in the substantial absence of the medium i.e. a neat reaction mixture of a free radical initiator, a dithio ester chain transfer agent and a radically polymerisable monomer.

As used herein the term "substantial absence" means that the medium for polymerisation is present in one embodiment at less than 5 wt % of the amount of monomer present, in another embodiment less than 2 wt % of the amount of monomer present, in another embodiment less than 0.5 wt % of the amount of monomer present neat an in yet another embodiment at 0 wt % of the amount of monomer present.

The medium for polymerisation is one in which the reactants are generally soluble, often a substantially inert normally liquid organic diluent. Examples include an oil of lubricating viscosity such as an oil with a low in halogen content or an alkyl aromatic compound such as toluene, xylene and naphthalene. Solvents which readily transfer hydrogen atoms under radical conditions are preferably avoided. The products are preferably soluble in the reaction medium. In several embodiments the medium for polymerisation has a sulphur content ranging from 0 ppm to 3000 ppm, or 1 ppm to 2000 ppm or 10 ppm to 1000 ppm.

In one embodiment the polymer prepared by step (2) comprises polymeric arms of:
  (a) an alkyl ester group containing 10 to 15 carbon atoms present in at least 50% to 100% of the alkyl groups;
  (b) an alkyl ester alkyl group containing 6 to 9 carbon atoms present at 0% to 20%, 30% or 40% of the alkyl groups;
  (c) an alkyl ester alkyl group containing 1 to 5 carbon atoms present at 0% to 18% or 20% or 30% of the alkyl groups;
  (d) an alkyl ester group containing 16 to 30 (or 16 to 18) carbon atoms present at 0% to 2% of the alkyl groups; and
  (e) a nitrogen containing monomer present at 0 wt % to 10 wt % of the polymeric arms.

In one embodiment the polymer prepared by step (2) comprises polymeric arms of:
  (a) an alkyl ester group containing 10 to 18 carbon atoms present in at least 50% to 100% of the alkyl groups;
  (b) an alkyl ester alkyl group containing 6 to 9 carbon atoms present at 0% to 20%, 30% or 40% of the alkyl groups;
  (c) an alkyl ester alkyl group containing 1 to 5 carbon atoms present at 0% to 18% or 20% or 30% of the alkyl groups;
  (d) an alkyl ester group containing 19 to 30 carbon atoms present at 0% to 2% of the alkyl groups; and
  (e) a nitrogen containing monomer present at 0 wt % to 10 wt % of the polymeric arms.

Oil of Lubricating Viscosity

The lubricating oil composition includes natural or synthetic oils of lubricating viscosity, oil derived from hydrocracking, hydrogenation, hydrofinishing, and unrefined, refined and re-refined oils and mixtures thereof.

Natural oils include animal oils, vegetable oils, mineral oils and mixtures thereof. Synthetic oils include hydrocarbon oils, silicon-based oils, and liquid esters of phosphorus-containing acids. Synthetic oils may be produced by Fischer-Tropsch as-to-liquid synthetic procedure as well as other gas-to-liquid oils. In one embodiment the polymer composition of the present invention is useful when employed in a gas-to-liquid oil. Often Fischer-Tropsch hydrocarbons or waxes may be hydroisomerised.

Oils of lubricating viscosity may also be defined as specified in the American Petroleum Institute (API) Base Oil Interchangeability Guidelines. In one embodiment the oil of lubricating viscosity comprises an API Group I, II, III, IV, V, VI or mixtures thereof, and in another embodiment API Group I, II, III or mixtures thereof. If the oil of lubricating viscosity is an API Group II, III, IV, V or VI oil there may be up to 40 wt % and in another embodiment up to a maximum of 5 wt % of the lubricating oil an API Group I oil present.

The oil of lubricating viscosity in one embodiment is present from 15 wt % to 99.9 wt % of the composition, in another embodiment from 30 wt % to 98.9 wt % of the composition, in another embodiment from 40 wt % to 97.9 wt % of the composition, in another embodiment and in another embodiment from 50 wt % to 94.5 wt % of the composition.

Lubricating Compositions of the Invention

The invention further provides a lubricating composition comprising:
  (a) a polymer from a reversible addition-fragmentation chain transfer controlled radical polymerisation process; and
  (b) an oil of lubricating viscosity.

In one embodiment the invention further provides a composition comprising a polymer containing a linear (meth)acrylate or styrene. In one embodiment the invention further provides a composition comprising a (meth)acrylate star polymer containing 7 or more arms, in another embodiment 8 or more arms, in another embodiment 10 or more arms, in another embodiment 12 or more arms and in yet another embodiment 16 or more arms. The number of arms present on the (meth)acrylate star polymer in one embodiment is less than 200, in another embodiment less than 100, in another embodiment less than 40, in another embodiment less than 30 and in another embodiment less than 20. Examples of suitable ranges for the number of arms present on the star polymer include 2 to 50, 2 to 25, 3 to 15, 3 to 30, 10 to 50 or 12 to 40.

In one embodiment the process of the invention prepares a polymer comprising a star polymer derived from at least two monomers comprising:
  (a) at least 50 wt % of a C12 to C15 alkyl substituted (meth)acrylate monomer; and
  (b) less than 50 wt % of an alkyl (meth)acrylate monomer containing 1 to 30 carbon atoms in the alkyl group, other than the C12 to C15 alkyl (meth)acrylate monomer;
  (c) optionally less than 20 wt % styrene; and
  (d) optionally less than 10 wt % alkyl methacrylamide.

In one embodiment the (meth)acrylate star polymer is free of at least one of a hydrogenated conjugated diene, a dialkyl fumarate, a N-alkylmaleimide and a N-arylmaleimide.

Other Performance Additives

The composition of the invention optionally further includes at least one other performance additive. The other performance additives include metal deactivators, detergents, dispersants, viscosity modifiers, friction modifiers, dispersant viscosity modifiers, extreme pressure agents, antiwear agents, antioxidant, corrosion inhibitors, foam inhibitors, demulsifiers, pour point depressants, seal swelling agents and mixtures thereof.

The total combined amount of the other performance additives present on an oil free basis ranges from 0 wt % to 25 wt %, in one embodiment 0.01 wt % to 20 wt %, in another embodiment 0.1 wt % to 15 wt % and in yet another embodiment 0.5 wt % to 10 wt % of the composition. Although one or more of the other performance additives may be present, it is common for the other performance additives to be present in different amounts relative to each other.

Antioxidants include a molybdenum dithiocarbamate, a sulphurised olefin, a hindered phenol, a diphenylamine; detergents include neutral or overbased, Newtonian or non-Newtonian, basic salts of alkali, alkaline earth and transition metals with one or more of a phenate, a sulphurised phenate, a sulphonate, a carboxylic acid, a phosphorus acid, a mono- and/or a di-thiophosphoric acid, a saligenin, an alkylsalicylate, a salixarate; and dispersants include N-substituted long chain alkenyl succinimides as well as posted treated versions thereof; post-treated dispersants include those by reaction with urea, thiourea, dimercaptothiadiazoles, carbon disulphide, aldehydes, ketones, carboxylic acids, hydrocarbon-substituted succinic anhydrides, nitriles, epoxides, boron compounds, and phosphorus compounds.

Antiwear agents include compounds such as metal thiophosphates, especially zinc dialkyldithiophosphates, phosphoric acid esters or salt thereof, phosphites; and phosphorus-containing carboxylic esters, ethers, and amides; antiscuffing agents including organic sulphides and polysulphides, such as benzyldisulphide, bis-(chlorobenzyl) disulphide, dibutyl tetrasulphide, di-tertiary butyl polysulphide, di-tert-butylsulphide, sulphurised Diels-Alder adducts or alkyl sulphenyl N'N-dialkyl dithiocarbamates; and extreme pressure (EP) agents including chlorinated wax, organic sulphides and polysulphides, such as benzyldisulphide, bis-(chlorobenzyl) disulphide, dibutyl tetrasulphide, sulphurised methyl ester of oleic acid, sulphurised alkylphenol, sulphurised dipentene, sulphurised terpene, and sulphurised Diels-Alder adducts. Phosphosulphurised hydrocarbons, metal thiocarbamates, such as zinc dioctyldithiocarbamate and barium heptylphenol diacid may also be used in the composition of the invention.

Additionally the invention may also include friction modifiers including fatty amines, esters such as borated glycerol esters, fatty phosphites, fatty acid amides, fatty epoxides, borated fatty epoxides, alkoxylated fatty amines, borated alkoxylated fatty amines, metal salts of fatty acids, fatty imidazolines, condensation products of carboxylic acids and polyalkylene-polyamines, amine salts of alkylphosphoric acids; viscosity modifiers including hydrogenated copolymers of styrene-butadiene, ethylene-propylene polymers, polyisobutenes, hydrogenated styrene-isoprene polymers, hydrogenated isoprene polymers, polymethacrylate acid esters, polyacrylate acid esters, polyalkyl styrenes, alkenyl aryl conjugated diene copolymers, polyolefins, polyalkylmethacrylates and esters of maleic anhydride-styrene copolymers; and dispersant viscosity modifiers (often referred to as DVM) include functionalised polyolefins, for example, ethylene-propylene copolymers that have been functionalized with the reaction product of maleic anhydride and an amine, a polymethacrylate functionalised with an amine, or esterified styrene-maleic anhydride copolymers reacted with an amine.

Other performance additives such as corrosion inhibitors including octylamine octanoate, condensation products of dodecenyl succinic acid or anhydride and a fatty acid such as oleic acid with a polyamine; metal deactivators including derivatives of benzotriazoles, 1,2,4-triazoles, benzimidazoles, 2-alkyldithiobenzimidazoles or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides; and seal swell agents including Exxon Necton-37™ (FN 1380) and Exxon Mineral Seal Oil (FN 3200) may also be used in the composition of the invention.

INDUSTRIAL APPLICATION

The invention is useful for a variety of applications for the production of star polymers by the process described above. The use of the composition described above, for instance in a transmission fluid, a gear oil, a hydraulic fluid or an internal combustion engine lubricant, to impart at least one property comprising acceptable low temperature and high temperature viscometrics, shear stability, dispersancy, viscosity index improving properties or mixture thereof. Dispersancy also includes dispersant viscosity modifier properties.

In one embodiment the lubricating composition is a gear oil and in another embodiment an automatic transmission fluid and in another embodiment an internal combustion engine fluid for crankcase lubrication.

The polymer is present in an oil of lubricating viscosity in one embodiment from 0.1 wt % to 60 wt % of the composition, in another embodiment from 1 wt % to 50 wt % of the composition, in another embodiment from 2 wt % to 45 wt % of the composition, in another embodiment and in another embodiment from 5 wt % to 40 wt % of the composition.

If the present invention is in the form of a concentrate (which may be combined with additional oil to form, in whole or in part, a finished lubricant), the ratio of the polymer of the invention and other optional performance additives in an oil of lubricating viscosity, to diluent oil including in the range of 80:20 to 10:90 by weight.

When the polymer is prepared and not mixed with an oil of lubricating viscosity, the polymer may be employed in a coating application. A coating application includes corrosion and oxidation inhibitors, durability agents, pigments, compatibilisers, thermoplastic elastomers, dispersing or rheology control agents, metallic flakes and other additives.

The following examples provide an illustration of the invention. These examples are non exhaustive and are not intended to limit the scope of the invention.

EXAMPLES

Examples 1-16

Narrow Polydispersity Linear PMAS by RAFT Polymerisation

A series of PMAs (polymethacrylates) of different weight average molecular weight (Mw) and monomer compositions are prepared by varying the amount of initiator and chain transfer agent according to the formula $M_w$=g of monomer/ (moles of initiator+moles CTA). Monomers, Trigonox™-21 (initiator), CTA (Chain Transfer Agent) and oil (30% wt) are combined at room temperature in a vessel equipped with a nitrogen inlet flowing at 28.3 L/hr, medium speed mechanical stirrer, a thermocouple and a water-cooled condenser and stirred under $N_2$ blanket for 20 minutes to ensure mixing. The nitrogen flow is reduced to 14.2 L/hr and the mixture is set to be heated to 90° C. for 4 hrs. The results obtained for weight average molecular weight (Mw), number average molecular weight (Mn) and the polydispersity (PDI) as measured by gel permeation chromatography (GPC) are shown in Table 1:

TABLE 1

| EX | VM Description | CTA | Ratio* | GPC Mn | GPC Mw | GPC PDI |
|---|---|---|---|---|---|---|
| 1 | $C_{12-15}$MA/2-EHMA (70:30 wt %) | CDB | 2:1 | 15300 | 19000 | 1.24 |
| 2 | $C_{12-15}$MA/2-EHMA (70:30 wt %) | CDB | 2:1 | 192000 | 250000 | 1.30 |
| 3 | $C_{12-15}$MA/MMA (80:20 wt %) | CDB | 2:1 | 36800 | 41800 | 1.14 |
| 4 | $C_{12-15}$MA/MMA (80:20 wt %) | CDB | 2:1 | 26900 | 31400 | 1.16 |
| 5 | $C_{12-15}$MA/MMA (80:20 wt %) | CDB | 2:1 | 32500 | 39300 | 1.21 |
| 6 | $C_{12-15}$MA/MMA (90:10 wt %) | CDB | 2:1 | 31800 | 37300 | 1.17 |
| 7 | $C_{12-15}$MA/2-EHMA (70:30 wt %) | CDB | 2:1 | 26300 | 32700 | 1.24 |
| 8 | $C_{12-15}$MA/2-EHMA (70:30 wt %) | $C_{12}$-TTC | 5:1 | 29600 | 42200 | 1.42 |
| 9 | $C_{12-15}$MA/2-EHMA (70:30 wt %) | $C_{12}$-TTC | 5:1 | 7800 | 10500 | 1.11 |
| 10 | $C_{12-15}$MA/2-EHMA (70:30 wt %) | $C_{12}$-TTC | 5:1 | 21800 | 30200 | 1.38 |
| 11 | $C_{12-15}$MA/2-EHMA (70:30 wt %) | $C_{12}$-TTC | 2:1 | 15500 | 20900 | 1.35 |
| 12 | $C_{12-15}$MA/2-EHMA (70:30 wt %) | $C_{12}$-TTC | 3:1 | 14300 | 18900 | 1.32 |
| 13 | $C_{12-15}$MA/2-EHMA (70:30 wt %) | $C_{12}$-TTC | 4:1 | 13500 | 17800 | 1.32 |
| 14 | $C_{12-15}$MA/2-EHMA (70:30 wt %) | $C_{12}$-TTC | 5:1 | 12900 | 17200 | 1.33 |
| 15 | $C_{12-15}$MA/MMA (80:20 wt %) | $C_{12}$-TTC | 2:1 | 16700 | 22800 | 1.36 |
| 16 | $C_{12-15}$MA/2-EHMA (70:30 wt %) | $C_{12}$-TTC | 2:1 | 7900 | 10700 | 1.36 |

Footnote to Table 1:
Ratio* is the ratio of CTA/T-21
$C_{12-15}$MA is C12 to C15 alkyl methacrylate;
MMA is methyl methacrylate;
2-EHMA is 2-ethylhexyl methacrylate;
CTA is chain transfer agent;
T-21 is Trigonox™-21;
CDB is cumyl dithiobenzoate; and
$C_{12}$-TTC is 2-dodecylsulfanylthiocarbonylsulfanyl-2-methyl-propionic acid

Examples 17-22

Narrow Polydispersity Linear Block/Tapered Copolymers by RAFT Polymerisation A series of block copolymers with varying monomer composition within the blocks and different overall molecular weights are prepared by a process similar to that of examples 1-16 except the monomers are added in two portions, where the second monomer portion also contains an additional small amount (~10 wt % of the initial charge) of the free radical initiator (see Table 2). In examples 17-19, the first portion contains $C_{12-15}$MA and this is allowed to polymerise for 4 hrs before the second monomer is added to allow the formation of block/tapered copolymer. In examples 20-21, the first portion contains a mixture of $C_{12-15}$MA and 2-EHMA, polymerisation of which forms a random first block. Addition of styrene as a second monomer portion leads to the formation of block/tapered copolymer. Example 22 is prepared in similar manner to examples 20-21, except the first portion of monomer is a mixture of $C_{12-15}$MA and MMA.

TABLE 2

| Example | VM Description | GPC Mn | GPC Mw | GPC PDI |
|---|---|---|---|---|
| 17 | $PC_{12-15}$MA-b-PS (80:20 wt %) | 33600 | 39700 | 1.18 |
| 18 | $PC_{12-15}$MA-b-PMMA (90:10 wt %) | 26200 | 22600 | 1.15 |
| 19 | $PC_{12-15}$MA-b-PEHMA (70:30 wt %) | 32700 | 39000 | 1.19 |
| 20 | $P(C_{12-15}$MA/2-EHMA)-b-PS (63:27:10 wt %) | 30000 | 37100 | 1.23 |
| 21 | $P(C_{12-15}$MA/2-EHMA)-b-PS (56:24:20 wt %) | 27600 | 35200 | 1.27 |
| 22 | $P(C_{12-15}$MA/MMA)-b-PS (64:16:20 wt %) | 46500 | 52500 | 1.13 |

Footnote to Table 2:
PS is polystyrene;
$P_{12-15}$MA is poly $C_{12-15}$ alkyl methacrylate;
$P(C_{12-15}$MA/MMA) is copolymer of $C_{12-15}$ alkyl methacrylate and methyl methacrylate;
$C_{12-15}$MA/2-EHMA is is copolymer of $C_{12-15}$ alkyl methacrylate and 2-ethylhexyl methacrylate;
PEHMA is polymer of 2-ethylhexyl methacrylate; and
PMMA is poly methyl methacrylate.

Examples 23-36

Random Star Copolymer of a Polymethacrylate Coupled with DVB

A series of polymethacrylate stars of different overall molecular weight are prepared by varying the amount of initiator and divinyl benzene (DVB) as shown in the Table 3 below. $C_{12-15}$ methacrylate (70% wt), 2 ethylhexyl methacrylate (30% wt), Trigonox™-21 (1 eq), cumyl dithiobenzoate (2 eq) and oil (26% wt) are combined at room temperature in a vessel equipped with a nitrogen inlet flowing at 28.3 L/hr, medium speed mechanical stirrer, a thermocouple and a water-cooled condenser and are stirred under $N_2$ blanket for 20 minutes to ensure mixing. The nitrogen flow is reduced to 14.2 L/hr and the mixture is set to be heated to 90° C. for 4 hrs. DVB is charged to the reaction flask and the mixture is stirred at 90° C. for a maximum of 12 hours. The results obtained for weight average molecular weight (Mw), number average molecular weight (Mn), the polydispersity, the number of arms on the star polymer and the percentage conversion to star polymer based on the amount of polymer arm converted to the star polymer are shown in Table 3:

TABLE 3

| Example | Mn of the arm g/mol | wt % Trigonox 21 | Ratio * | Average No. of arms | % ** | Mw of the star (1000's) | Mn of the star (1000's) | PDI |
|---|---|---|---|---|---|---|---|---|
| 23 | 16,000 | 0.7 | 5:1 | 2 | 8 | 48 | 47 | 1.02 |
| 24 | 16,000 | 0.7 | 10:1 | 4 | 49 | 77 | 74 | 1.04 |

TABLE 3-continued

| Example | Mn of the arm g/mol | wt % Trigonox 21 | Ratio * | Average No. of arms | % ** | Mw of the star (1000's) | Mn of the star (1000's) | PDI |
|---|---|---|---|---|---|---|---|---|
| 25 | 16,000 | 0.7 | 17:1 | 7 | 78 | 133 | 104 | 1.28 |
| 26 | 20,000 | 0.5 | 10:1 | 2 | 16 | 61 | 58 | 1.05 |
| 27 | 20,000 | 0.5 | 17:1 | 4 | 57 | 101 | 83 | 1.22 |
| 28 | 20,000 | 0.5 | 25:1 | 12 | 76 | 323 | 220 | 1.47 |
| 29 | 33,000 | 0.5 | 5:1 | 3 | 20 | 87 | 84 | 1.04 |
| 30 | 33,000 | 0.3 | 10:1 | 3 | 38 | 102 | 93 | 1.10 |
| 31 | 33,000 | 0.3 | 17:1 | 5 | 68 | 190 | 160 | 1.19 |
| 32 | 33,000 | 0.3 | 25:1 | 7 | 76 | 286 | 230 | 1.24 |
| 33 | 33,000 | 0.3 | 34:1 | 10 | 79 | 378 | 294 | 1.29 |
| 34 | 54,000 | 0.2 | 17:1 | 3 | 10 | 148 | 143 | 1.03 |
| 35 | 54,000 | 0.2 | 25:1 | 6 | 66 | 378 | 304 | 1.24 |
| 36 | 54,000 | 0.2 | 34:1 | 6 | 63 | 384 | 311 | 1.23 |

Where * is the ratio of_DVB:polymer and where ** is the conversion of polymer chain to star polymer.

In one experiment not included in the above table, an oil-insoluble material of apparently very high molecular weight was formed, for reasons that are not clear.

Examples 37-41

Random Star Copolymer of a Polymethacrylate Coupled with HDDMA

The process is similar to examples 23-36 except the monomer composition varied as is shown in Table 4 the coupling agent is 1,6-hexanediol dimethacrylate (HDDMA) and hydroquinone monomethyl ether (HQMME) is added to inhibit further coupling. The HDDMA:polymer ratio for all examples is 7:1 and the results obtained are shown in Table 5:

TABLE 4

| Example | Polymer Composition |
|---|---|
| 37 | 70 wt % C12 to C15 methacrylate; and 30 wt % 2-ethylhexylmethacrylate |
| 38 | 80 wt % C12 to C15 methacrylate; and 20 wt % methyl methacrylate |
| 39 | 90 wt % C12 to C15 methacrylate; and 10 wt % methyl methacrylate |
| 40 | 70 wt % C12 to C15 methacrylate; and 30 wt % 2-ethylhexylmethacrylate |
| 41 | 70 wt % C12 to C15 methacrylate; and 30 wt % 2-ethylhexylmethacrylate |

Examples 42-45

Block/Tapered Star Copolymers with HDDMA

The process is similar to examples 37-41 except the monomer composition is varied as is shown in Table 6 and the monomers are added in 2 portions as described in examples 17-22. The HDDMA:polymer ratio for all examples is 7:1 and the results obtained are shown in Table 7:

TABLE 6

| Example | Block Copolymer Composition |
|---|---|
| 42 | (C12 to C15 methacrylate)-b-(methyl methacrylate) with wt % ratio of 80:20 |
| 43 | (C12 to C15 methacrylate)-b-(methyl methacrylate) with wt % ratio of 70:30 |
| 44 | (C12 to C15 methacrylate-b-2-ethylhexyl methacrylate)-b-(styrene) with a wt % ratio of 63:27:10 |
| 45 | (C12 to C15 methacrylate-b-2-ethylhexyl methacrylate)-b-(styrene) with a wt % ratio of 56:24:20 |

TABLE 5

| EX | Mn of the arm g/mol | wt % T-21 | CTA/T-21 ratio | Average No. of arms | % conversion to star polymer | Mw of the star (1000's) | Mn of the star (1000's) | PDI |
|---|---|---|---|---|---|---|---|---|
| 37 | 15300 | 2.3 | 2/1 | 13 | 80 | 262.4 | 209.5 | 1.25 |
| 38 | 26900 | 0.4 | 2/1 | 8 | 76.5 | 253.3 | 181.3 | 1.4 |
| 39 | 31800 | 0.3 | 2/1 | 4.2 | 47 | 158.2 | 64.1 | 2.47 |
| 40 | 29600 | 0.12 | 5/1 | 11 | 76.8 | 467.6 | 365.6 | 1.28 |
| 41 | 21800 | 0.18 | 5/1 | 13 | 86.9 | 406 | 319 | 1.28 |

TABLE 7

| Example | Mn of the arm g/mol | wt % Trigonox 21 | No. of arms | % conversion to star polymer | Mw of the star (1000's) | Mn of the star (1000's) | PDI |
|---|---|---|---|---|---|---|---|
| 42 | 26200 | 0.36 | 8 | 35 | 186.5 | 157.4 | 1.18 |
| 43 | 32700 | 0.29 | 8 | 55 | 373.3 | 289.9 | 1.29 |
| 44 | 30000 | 0.28 | 8 | 22 | 263.1 | 228.3 | 1.15 |
| 45 | 27600 | 0.28 | 9 | 38 | 363.8 | 311.2 | 1.17 |

Examples 46

Star Polymer with Amine Functionality

The process is the same as described in examples 23-36, except the copolymer is formed from monomers of C12 to C15 methacrylate (78.2% wt), methyl methacrylate (20.1% wt), dimethylaminopropyl methacrylamide (1.8% wt). Table 8 presents characterization data for the polymer formed:

TABLE 8

| Example | No. of Arms | Mw of the star (1000's) | Mn of the star (1000's) | PDI |
|---|---|---|---|---|
| 46 | 12 | 24.04 | 14.87 | 1.62 |

Examples 47 to 59

RAFT Polymers Prepared with Ethylene Glycol Dimethacrylate

Examples 47 to 59 are prepared by similar process as Examples 1-14, except ethylene glycol dimethacrylate is used instead of DVB. The mole % ratio of ethylene glycol dimethacrylate to polymer arms in resultant star polymer is 3:1 unless otherwise stated. Typically the polymers are prepared in 30 to 40 wt % of base/diluent oil. The results obtained for average weight molecular weight (Mw), number average molecular weight (Mn), the polydispersity (PDI) as measured by gel permeation chromatography (GPC), the average number of arms on the star polymer and the percentage conversion to star polymer is based on the amount of polymer arm converted to the star polymer are shown in Table 9:

TABLE 9

| EX | Polymer Composition of Polymer Arms (wt % of monomer) | | | | Mn of the arm g/mol | Average No. of arms | %** | Star Polymer Mw (1000's) | Star Polymer Mn (1000's) | PDI |
| | A | B | C | D | | | | | | |
|---|---|---|---|---|---|---|---|---|---|---|
| 47 | 78.2 | 20 | 1.8 | 0 | 14,100 | 7 | 32 | 161.9 | 129.3 | 1.25 |
| 48 | 86 | 14 | 0 | 0 | 17,900 | 9 | 73 | 249 | 190.5 | 1.3 |
| 49 | 78.2 | 20 | 0 | 1.8 | 16,500 | 8 | 70 | 189.5 | 148.8 | 1.27 |
| 50[1] | 78.2 | 20 | 0 | 1.8 | 11,800 | 5 | 62 | 76.1 | 65.3 | 1.16 |
| 51[2] | 86 | 14 | 0 | 0 | 47,800 | 5 | 34 | 410.2 | 345 | 1.2 |
| 52 | 78.2 | 20 | 0 | 1.8 | 15,400 | 7 | 63 | 133.7 | 106 | 1.26 |
| 53 | 78.2 | 20 | 0 | 1.8 | 11,600 | 5 | 54 | 74.5 | 61.6 | 1.2 |
| 54[1] | 78.2 | 20 | 0 | 1.8 | 17,700 | 4 | 52 | 88.2 | 75.7 | 1.16 |
| 55 | 80 | 20 | 0 | 0 | 19,700 | 9 | 72 | 383.3 | 215.9 | 1.31 |
| 56 | 80 | 20 | 0 | 0 | 19,200 | 9 | 67 | 293.5 | 220.7 | 1.33 |
| 57 | 80 | 20 | 0 | 0 | 31,300 | 10 | 17 | 561.1 | 474.1 | 1.18 |
| 58[3] | 80 | 20 | 0 | 0 | 30,200 | 16 | 75 | 821.5 | 530.5 | 1.55 |
| 59 | 80 | 20 | 0 | 0 | 14,800 | 6 | 24 | 160.6 | 137.5 | 1.17 |

Footnote to Table 8
[1]polymer prepared from 1:1 mole % ratio of ethylene glycol dimethacrylate to polymer arms in resultant star polymer;
[2]polymer prepared from 4:1 mole % ratio of ethylene glycol dimethacrylate to polymer arms in resultant star polymer;
[3]polymer prepared from 7:1 mole % ratio of ethylene glycol dimethacrylate to polymer arms in resultant star polymer;
A is lauryl methacrylate;
B is maleic anhydride;
C is dimethylaminopropyl methacrylamide;
D is dimethylaminoethyl methacrylate; and
**is the conversion of polymer chain to star polymer.

Lubricating Composition Examples 1-59

Lubricating compositions 1 to 59 are prepared by blending the polymers of examples 1 to 59 respectively into 4 mm²/s PetroCanada base oil containing 0.2% by weight of a polymeric pour point depressant. The lubricating composition has an oil blend viscosity ranging from 8 to 12 mm²/s. The Kinematic Viscosity (KV) and Brookfield Viscosity (BV) are determined employing ASTM methods D445 at 100° C. and D2983 at −40° C. respectively. The viscosity index (VI) is also determined by employing the ASTM method D2270. The lubricating composition is also subjected to shear as determined by KRL tapered bearing shear stability test employing a 4-ball wear test instrument as is used in CEC DIN 51350 Part 6 test procedure. The instrument is run for 20 hours with a 5000 N load, at 140° C. and at 1450 rpm. The viscosity data obtained from the test is described in ASTM method D445. The results obtained for examples 23 to 36 are shown in Tables 10 and 11.

TABLE 10

| Lubricating Composition Example | Polymer Example | Treat Rate (wt %) | BV −40 (1000's) | KV100 | Viscosity Index |
|---|---|---|---|---|---|
| 23 | 23 | 16.7 | 10.6 | 8.55 | 189 |
| 24 | 24 | 15.4 | 10.4 | 9.01 | 201 |
| 25 | 25 | 17.1 | 12.4 | 12.29 | 230 |
| 26 | 26 | 22.1 | 16.2 | 11.64 | 205 |
| 27 | 27 | 17.1 | 13.2 | 12.8 | 227 |
| 28 | 28 | 13.8 | 10.8 | 13.49 | 248 |
| 29 | 29 | 13 | 12.6 | 11.08 | 214 |
| 30 | 30 | 14.4 | 13.4 | 10.98 | 209 |
| 31 | 31 | 10.4 | 11.2 | 11.24 | 225 |
| 32 | 32 | 9.5 | 10.4 | 11.49 | 231 |
| 33 | 33 | 9 | 9.95 | 11.82 | 239 |
| 34 | 34 | 11.7 | 11.4 | 10.94 | 218 |
| 35 | 35 | 7.7 | 10.4 | 11.25 | 229 |
| 36 | 36 | 8.7 | 10.4 | 12.49 | 238 |

TABLE 11

| Oil Example | Polymer Example | Kinematic Viscosity at 100° C. after KRL Shear Test | Viscosity Loss After Shear | Shear Stability Index (SSI) |
|---|---|---|---|---|
| 23 | 23 | 7.92 | 7.4 | 15.87 |
| 24 | 24 | 7.98 | 11.4 | 23.25 |
| 25 | 25 | 10.01 | 18.5 | 29.57 |
| 26 | 26 | 9.63 | 17.3 | 28.47 |
| 27 | 27 | 9.16 | 28.4 | 44.28 |
| 28 | 28 | 8.55 | 36.6 | 55.44 |
| 29 | 29 | 7.76 | 30.0 | 51.08 |
| 30 | 30 | 8.26 | 24.9 | 42.50 |
| 31 | 31 | 7.55 | 32.6 | 55.41 |
| 32 | 32 | 7.15 | 38.0 | 62.81 |
| 33 | 33 | 7.1 | 40.1 | 65.19 |
| 34 | 34 | 7.39 | 32.4 | 55.82 |
| 35 | 35 | 6.81 | 39.5 | 66.57 |
| 36 | 36 | 6.87 | 45.0 | 71.05 |

Automatic Transmission Fluid Lubricating Compositions 1 to 59

Automatic Transmission fluid lubricating compositions 1 to 59 (ATF Examples) are prepared by blending the polymers into an oil of lubricating viscosity to an oil blend viscosity at 100° C. of 7.0-7.2 mm²/s. This oil further contains a commercially available dispersant-inhibitor package. Viscometric and shear experiments are carried out as described for lubricating compositions 1 to 46. The results obtained for several of these compositions are presented in Tables 12 and 13.

TABLE 12

| ATF Example | Polymer Example | Treat Rate (wt %) | BV −40 (1000's) | KV100 | Viscosity Index |
|---|---|---|---|---|---|
| 46 | 46 | 5.9 | 5.26 | 7.2 | 255 |
| 37 | 37 | 10.26 | -a- | 7.2 | 216 |
| 38 | 38 | 8.01 | 5.67 | 7.2 | 240 |
| 39 | 39 | 10 | 81.6 | 7.2 | 232 |

-a- denotes measurement not made.

TABLE 13

| ATF Example | Polymer Example | Kinematic Viscosity at 100° C. after KRL Shear Test | Viscosity Loss After Shear | Shear Stability Index (SSI) |
|---|---|---|---|---|
| 37 | 37 | 6.0 | 14.5 | 31.4 |
| 38 | 38 | 5.85 | 21.9 | 35.3 |

Gear Oil Lubricating Compositions 1 to 59

Gear Oil lubricating compositions 1 to 59 are prepared by blending the polymers of Examples 1 to 59 respectively into a gear oil fluid.

In summary the invention provides a process for preparing a polymer and compositions thereof with dispersant and viscosity modifying properties, including low temperature viscometrics and shear stability.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements. As used herein, the expression "consisting essentially of" permits the inclusion of substances that do not materially affect the basic and novel characteristics of the composition under consideration. As used herein any member of a genus (or list) may be excluded from the claims.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

hetero substituents, that is, substituents which, while having a predominantly hydrocarbon character, in the context of this invention, contain other than carbon in a ring or chain otherwise composed of carbon atoms; and Heteroatoms include sulphur, oxygen, nitrogen, and encompass substituents as pyridyl, furyl, thienyl and imidazolyl. In general, no more than two, in one aspect no more than one, non-hydrocarbon substituent will be present for every ten carbon atoms in the hydrocarbyl group; typically, there will be no non-hydrocarbon substituents in the hydrocarbyl group.

What is claimed is:

1. A process for preparing a polymer and a lubricating composition thereof, comprising the steps of:
   (1) contacting:
      (i) a free radical initiator;
      (ii) a chain transfer agent containing a thiocarbonyl thio group and a free radical leaving group; and
      (iii) a radically polymerisable monomer, to form a polymer chain;
   wherein the process of step (1) is a controlled radical polymerisation process with living characteristics; and at least about 50% of the polymer chains from step (1) contain a reactive end group capable of reacting with a polyvalent coupling agent;
   (2) contacting the polymer prepared by step (1) with a polyvalent coupling agent to form a star-polymer,
   wherein the star-polymer is a block-arm star polymer or a hetero-arm star polymer; and
   wherein the star polymer is derived from at least two monomers comprising:
      (a) at least 50 wt % of a mixture of C12 to C15 alkyl substituted (meth)acrylate monomers; and
      (b) less than 50 wt % of an alkyl (meth)acrylate monomer containing 1 to 30 carbon atoms in the alkyl group, other than the C12 to C15 alkyl substituted (meth)acrylate monomer;
      (c) optionally containing less than 20 wt % styrene; and
      (d) optionally containing less than 10 wt % alkyl (meth)acrylamide,
   and wherein the star-polymer has about 2 to about 50 arms present on the star polymer;
   (3) optionally contacting the polymer prepared by step (1) or step (2) with a polymerisation inhibitor; and
   (4) mixing the polymer prepared by step (2) or step (3) with an oil of lubricating viscosity to form a lubricating composition.

2. The process of claim 1, wherein the chain transfer agent is represented by the formulae (Ia) or (Ib):

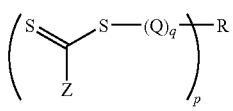
(Ia)

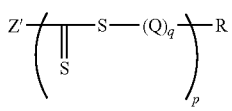
(Ib)

wherein
   Z is independently hydrogen, a halogen, such as chlorine, bromine or iodine, a hydrocarbyl group or a group containing a heteroatom bonded directly to the carbon of the thiocarbonyl group and containing a heteroatom including oxygen, nitrogen, phosphorus or sulphur;
   Z' is independently a moiety including a polymer chain, a hydrocarbyl group, a heteroatom including oxygen, nitrogen, phosphorus or sulphur further containing at least one carbon atom incorporated into a linear or branched optionally substituted alkyl group and/or aryl group;
   Q is a conjugating group;
   q is an integer from 0 to 10;
   p is an integer from 1 to 200; and
   R is a free radical leaving group capable of initiating free radical polymerisation.

3. The process of claim 2, wherein chain transfer agent has q equal to 0 and the chain transfer agent is represented by formulae (Ic) or (Id):

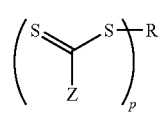
(Ic)

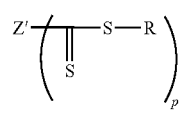
(Id)

wherein
   Z is independently hydrogen, a halogen, such as chlorine, bromine or iodine, a hydrocarbyl group or a group containing a heteroatom bonded directly to the carbon of the thiocarbonyl group and containing a heteroatom including oxygen, nitrogen, phosphorus or sulphur;
   Z' is independently a moiety including a polymer chain, a hydrocarbyl group, a heteroatom including oxygen, nitrogen, phosphorus or sulphur further containing at least one carbon atom incorporated into a linear or branched optionally substituted alkyl group and/or aryl group;
   p is an integer from 1 to 200; and
   R is a free radical leaving group capable of initiating free radical polymerisation.

4. The process of claim 2, wherein chain transfer agent containing is represented by formula (Ie) or (If):

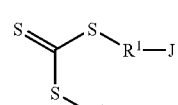
(Ie)

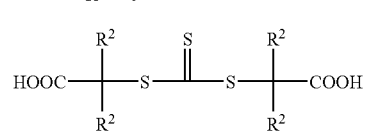
(If)

and wherein
   J is independently a group including cyano, halogen, carboxylic acid, carboxylic ester, and carboxylic amide or imide;
   $R^1$ is independently a hydrocarbyl group that is optional substituted with a functional group defined by $R^2$; and
   $R^2$ is independently a cyano group, a halogen, such as, chlorine, fluorine, iodine or bromine, or hydrocarbyl group such as a linear or branched alkyl group or an aryl group containing 1 to 50 carbon atoms.

5. The process of claim 1, wherein the star-polymer has a $M_w$ of about 10,000 to about 400,000.

6. The process of claim 1, wherein the polyvalent coupling agent is a of the general formula;

where
Y is a functionality capable of covalently reacting with an alkyl radical or an oxygen-centered radical;
W is a hydrocarbyl group; and
n=2 or more.

7. The process of claim 6, wherein the polyvalent coupling agent is a crosslinking (meth)acrylic monomer or a crosslinking divinyl non-acrylic monomer.

8. The process of claim 1, wherein the star-polymer has a $M_w$ of about 10,000 to about 600,000.

9. The process of claim 1, wherein the alkyl (meth)acrylamide is an alkyl methacrylamide.

10. A process for preparing a polymer and a lubricating composition thereof, comprising the steps of:
    (1) contacting:
        (i) a free radical initiator;
        (ii) a chain transfer agent containing a thiocarbonyl thio group and a free radical leaving group; and
        (iii) a radically polymerisable monomer, to form a polymer chain;
    wherein the process of step (1) is a controlled radical polymerisation process with living characteristics; and at least about 50% of the polymer chains from step (1) contain a reactive end group capable of reacting with a polyvalent coupling agent;
    (2) contacting the polymer prepared by step (1) with a polyvalent coupling agent of the general formula:

where
Y is a functionality capable of covalently reacting with an alkyl radical or an oxygen-centered radical;
W is a hydrocarbyl group; and
n=2 or more to form a star-polymer,
wherein the star polymer is derived from at least two monomers comprising:
    (a) at least 50 wt % of a mixture of C12 to C15 alkyl substituted (meth)acrylate monomers; and
    (b) less than 50 wt % of an alkyl (meth)acrylate monomer containing 1 to 30 carbon atoms in the alkyl group, other than the C12 to C15 substituted alkyl (meth)acrylate monomer;
    (c) optionally containing less than 20 wt % styrene; and
    (d) optionally containing less than 10 wt % alkyl (meth)acrylamide,
and wherein the star-polymer has about 2 to about 50 arms present on the star polymer;
    (3) optionally contacting the polymer prepared by step (1) or step (2) with a polymerisation inhibitor; and
    (4) mixing the polymer prepared by step (2) or step (3) with an oil of lubricating viscosity to form a lubricating composition.

11. The process of claim 10 wherein the polyvalent coupling agent is a crosslinking (meth)acrylic monomer or a crosslinking divinyl non-acrylic monomer.

12. The process of claim 10, wherein the chain transfer agent is represented by the formulae (Ia) or (Ib):

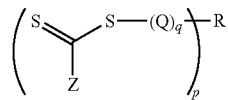

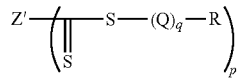

wherein
Z is independently hydrogen, a halogen, such as chlorine, bromine or iodine, a hydrocarbyl group or a group containing a heteroatom bonded directly to the carbon of the thiocarbonyl group and containing a heteroatom including oxygen, nitrogen, phosphorus or sulphur;

Z' is independently a moiety including a polymer chain, a hydrocarbyl group, a heteroatom including oxygen, nitrogen, phosphorus or sulphur further containing at least one carbon atom incorporated into a linear or branched optionally substituted alkyl group and/or aryl group;

Q is a conjugating group;
q is an integer from 0 to 10;
p is an integer from 1 to 200; and
R is a free radical leaving group capable of initiating free radical polymerisation.

13. The process of claim 12, wherein chain transfer agent has q equal to 0 and the chain transfer agent is represented by formulae (Ic) or (Id):

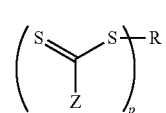

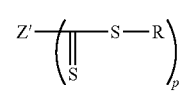

wherein
Z is independently hydrogen, a halogen, such as chlorine, bromine or iodine, a hydrocarbyl group or a group containing a heteroatom bonded directly to the carbon of the thiocarbonyl group and containing a heteroatom including oxygen, nitrogen, phosphorus or sulphur;

Z' is independently a moiety including a polymer chain, a hydrocarbyl group, a heteroatom including oxygen, nitrogen, phosphorus or sulphur further containing at least one carbon atom incorporated into a linear or branched optionally substituted alkyl group and/or aryl group;

p is an integer from 1 to 200; and
R is a free radical leaving group capable of initiating free radical polymerisation.

14. The process of claim 12, wherein chain transfer agent containing is represented by formula (Ie) or (If):

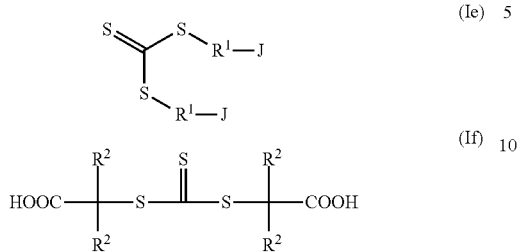

and wherein

J is independently a group including cyano, halogen, carboxylic acid, carboxylic ester, and carboxylic amide or imide;

$R^1$ is independently a hydrocarbyl group that is optional substituted with a functional group defined by $R^2$; and $R^2$ is independently a cyano group, a halogen, such as, chlorine, fluorine, iodine or bromine, or hydrocarbyl group such as a linear or branched alkyl group or an aryl group containing 1 to 50 carbon atoms.

15. The process of claim 10, wherein the star-polymer is a block-arm star polymer or a hetero-arm star polymer.

16. The process of claim 10, wherein the star-polymer has a $M_w$ of about 10,000 to about 400,000.

17. The process of claim 10, wherein the star-polymer has a Mw of about 10,000 to about 600,000.

18. The process of claim 10, wherein the alkyl (meth) acrylamide is an alkyl methacrylamide.

19. A lubricating composition comprising the product of the process of claim 1.

20. A lubricating composition comprising the product of the process of claim 10.

* * * * *